May 12, 1931.  G. F. MURPHY  1,805,102

EXPANSION JOINT AND ANCHORAGE THEREFOR

Filed Oct. 12, 1926

INVENTOR
BY George F. Murphy
ATTORNEYS

Patented May 12, 1931

1,805,102

UNITED STATES PATENT OFFICE

GEORGE F. MURPHY, OF PHILADELPHIA, PENNSYLVANIA

EXPANSION JOINT AND ANCHORAGE THEREFOR

Application filed October 12, 1926. Serial No. 141,171.

This invention relates to expansion joints and anchorage therefor, and is especially useful in fluid pipe lines, particularly where the fluid is under pressure and is also hot. While my invention is described herein in connection with expansion joints, it will be understood that it is useful also in other directions in fluid lines.

The nature, objects and advantages of the invention will be best understood from the following:

In expansion joints, it has been customary to cast the supporting base or bases integrally with the casing of the joint. This is disadvantageous, for the reason that in the region of the base, the metal must be quite thick, as compared to other portions of the casing, in consequence of which there is an unevenness in cooling which causes defects and strains, making the metal more or less porous. This is objectionable, particularly in pressure lines, as leaks are apt to develop in a comparatively short time. It has been heretofore attempted to overcome this difficulty by coring out the bases, but this is comparatively unsatisfactory.

In addition to the foregoing there are also difficulties encountered by reason of space limitations. For example, manholes in cities are usually of a standard size. The casting of the supporting bases integral with the expansion joints makes it impossible to introduce, through the manholes, an expansion joint of maximum size, i. e., an expansion joint of a size which, in the absence of such supporting bases, could be introduced through the manhole. Thus, very frequently, it is impossible to introduce an expansion joint of adequate size, and expansion joints in reality too small for the particular service must be employed.

The primary object of my invention is to overcome these difficulties.

How the foregoing, together with such other objects as may hereinafter appear, or are incident to my invention, are realized, is illustrated in the preferred form in the accompanying drawings, wherein—

Figure 1:
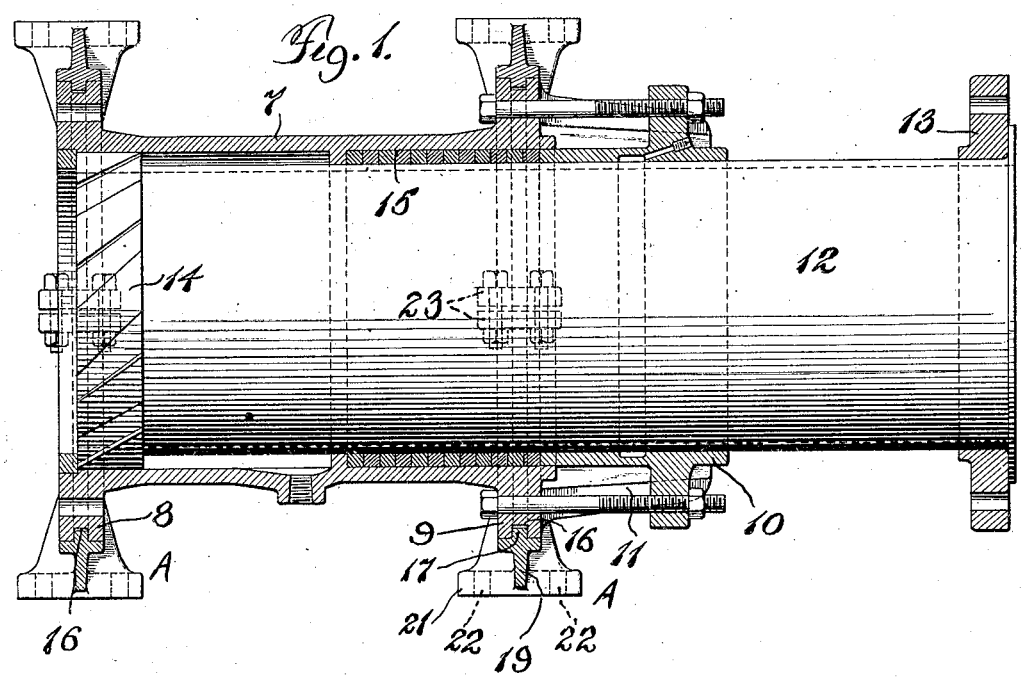
Figure 2:
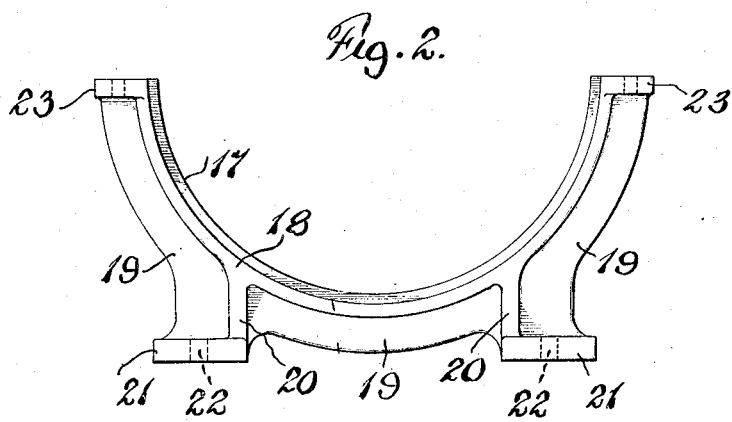

Fig. 1 is a longitudinal section through an expansion joint embodying my improvements, and Fig. 2 is a side elevation of a base member utilized in carrying out my invention.

Referring now to Fig. 1, the reference numeral 7 indicates the expansion joint casing which is provided, at one end, with the flange 8 for attachment to the pipe line, and which is provided at the other end with a flange 9 for securing the combined gland and pipe guide 10. This combined gland and guide is supported exteriorly by the fingers 11 preferably cast integrally with the casing 7.

Extending within the casing is the telescopic pipe section 12 which has a flange 13 at its outer or free end for attachment to the pipe line, and which has a guide collar 14 at its inner end. The reference numeral 15 indicates the stuffing box between the telescopic pipe 12 and the casing 7.

The flanges 8 and 9 each have an annular groove 16 adapted to receive the annular ribs or tongues 17 of the supporting bars indicated, as a whole, by the reference letter A, whereby there is a tongue and groove connection between the bases and the flanges of the casing.

Each supporting base is split into two halves 18, such halves being preferably counterparts of one another. Each half section is strengthened by the rib portions 19 and 20, and each half has two base or foot portions 21, it being understood that each half is preferably composed of a single casting. Apertures 22 for securing each half member to the adjacent foundation or supporting means are provided in each portion 21 on opposite sides of the strengthening ribs 19. Each half member is also provided with apertured flanges 23 whereby the two halves may be bolted together in position around the respective flange of the casing, as indicated in Figure 1.

It will be seen that when the two halves are bolted together in position, they are securely and rigidly fixed to the casing and support the latter fully when the supporting bases are secured to the adjacent structure.

By the provision of such a detachable separable supporting base structure I obviate the difficulties incident to the local thickening of the metal in joints where the bases are cast integrally with the casing. I am also enabled to introduce a miximum size expansion joint into a manhole for the reason that the joint and the bases can be separately introduced through the manhole and assembled, so to speak, in the conduit.

On inspection of Fig. 1, it will be seen that I have thickened the wall of the casing adjacent to the flanges 8 and 9, this thickening being gradual, and its purpose being to minimize any difficulties which might arise by virtue of the fact that the flanges are cast thicker than the main portion of the wall of the casing.

The invention is especially useful for anchoring parts in steam lines, gas lines, and oil lines.

I claim:—

1. An anchor adapted to support an expansion joint having its casing provided with annular flanges at its ends for attachment, said anchor comprising two split rings, each ring being composed of two counterpart halves, each half having a base pad for attachment to a foundation or the like and having at each end a pad whereby the two halves may be secured together, and the body portion of each half having means for interlocking with a flange when halves are assembled to prevent longitudinal movement in either direction, and means for bolting halves together.

2. An anchor adapted to support an expansion joint having its casing provided with annular flanges at its ends for attachment each provided with an annular groove, said anchor comprising two split rings, each ring being composed of two counterpart halves, each half having a base pad for attachment to a foundation or the like and having at each end a pad whereby the two halves may be secured together, and the body portion of each half having an annular rib on its inner periphery adapted to fit into said groove of a flange when halves are assembled, and means for bolting halves together.

3. An anchor adapted to support an expansion joint provided with an annular flange at an end thereof for attachment, said anchor comprising a split ring adapted to embrace the flange, the two parts of which are complementary, each part being provided with a base pad and each being provided at its ends with a pad for securing the parts together, the body portion of each part being provided with means adapted to interlock with the flange to prevent displacement of the joint longitudinally.

In testimony whereof I have hereunto signed my name.

GEORGE F. MURPHY.